April 27, 1937. B. G. CARLSON ET AL 2,078,560
ARTIFICIAL HORIZON
Filed Oct. 26, 1932 2 Sheets-Sheet 1

Bert G. Carlson
Leslie F. Carter.
BY Herbert H. Thompson
their ATTORNEY.

April 27, 1937.  B. G. CARLSON ET AL  2,078,560
ARTIFICIAL HORIZON
Filed Oct. 26, 1932  2 Sheets-Sheet 2
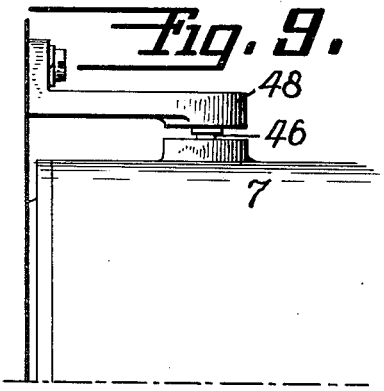
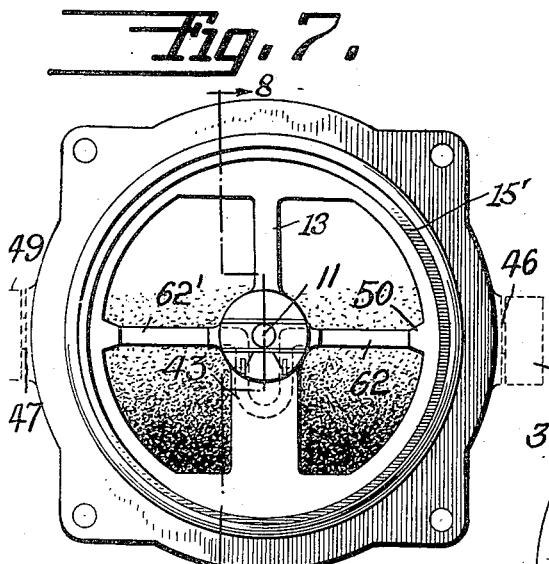
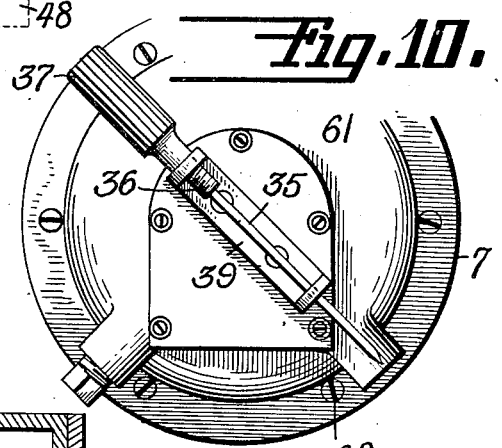
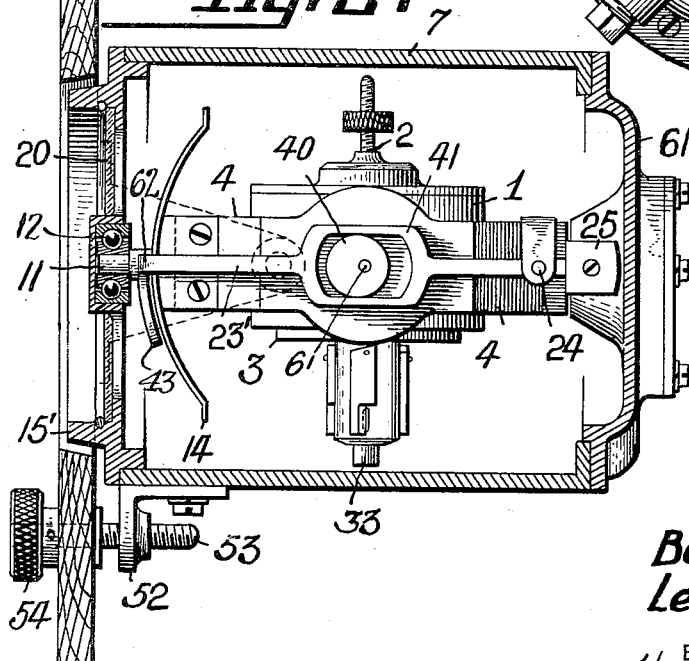
INVENTORS:
Bert G. Carlson
Leslie F. Carter
BY
Herbert H. Thompson
their ATTORNEY.

Patented Apr. 27, 1937

2,078,560

UNITED STATES PATENT OFFICE 2,078,560

ARTIFICIAL HORIZON

Bert G. Carlson, Queens Village, N. Y., and Leslie F. Carter, Leonia, N. J., assignors to Sperry Gyroscope Company, Inc., Brooklyn, N. Y., a corporation of New York Application October 26, 1932, Serial No. 639,600

5 Claims. (Cl. 33—204)

This invention relates to gyroscopic level indicating devices especially adapted for aircraft and of the type usually known in the art as artificial horizons. In this particular type of instrument, the apparent movements of the horizon with respect to the craft are simulated on the face of the instrument so that the aviator may fly blind by the instrument in the same manner as when flying in full view of the real horizon so that no likelihood of confusion or misinterpretation of the reading of the instrument is likely to occur. An example of this type of instrument is shown in a pending application of one of the joint inventors, Bert G. Carlson, now Patent No. 1,982,636, dated December 4, 1934, for Air driven gyro verticals. While such instruments are well adapted for ordinary flight, they cannot successfully be used for stunt flying or complicated military maneuvers on account of the fact that parts of the instrument will strike and disturb the gyroscope in case of loop-the-loops and barrel rolls.

In the present invention we endeavor to retain the advantages of the prior invention by retaining a single indicating member to simulate the apparent movements of the real horizon and, at the same time, produce an instrument which will retain its usefulness even in stunt flying, including loops and barrel rolls.

Referring to the drawings in which several forms of the invention are shown,

Fig. 7 is a face view of a modified form of our invention.

Fig. 8 is a side elevation of the same with the casing in vertical section.

Fig. 9 is a fragmentary top plan view showing the mounting of the instrument on the instrument board.

Fig. 10 is a rear elevation showing where the locking tool may be stored when not in use.

Figure 1:
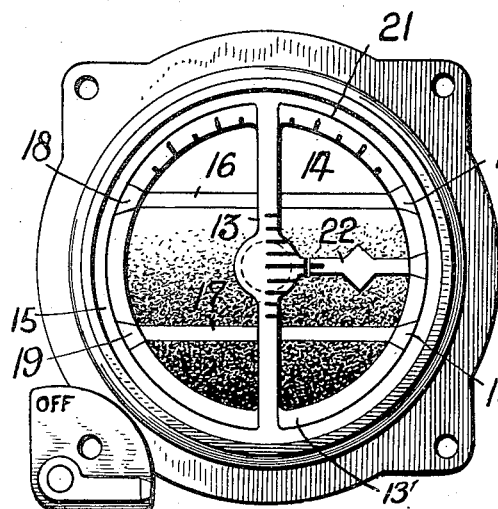
Fig. 1 shows a face view of one of our improved horizons.

The gyroscopic portion of the invention is shown as comprising a gyroscope 1 mounted for spinning about a normally vertical axis 2 within an enclosing casing 3. Said casing in turn is mounted for oscillation about a horizontal axis within gimbal ring 4 on bearings 5 and 6. Said gimbal ring is mounted for oscillation about a normally horizontal axis lying fore and aft of the craft within the enclosing housing or casing 7. The rear bearing is shown as consisting of a trunnion 8 projecting rearwardly from the gimbal which is journalled in a ball or other bearing 9 in the casing 7, channels 10 being provided to admit air for spinning the gyro as explained in the aforesaid joint application. The forward trunnion 11 is shown as journaled in a bearing 12 at the extreme forward end of the casing and which is supported by a bar or bars or flat strips 13 projecting inwardly from the front ring 15 forming the frame for the glass face 20. The casing is usually made air tight otherwise and air is pumped continuously from the same through pipe 62 to spin the gyroscope.

To the forward end of said gimbal is secured a mask 14 placed behind the window 20 in the front of the casing to hide the gyroscopic device. On said mask is placed one or more normally horizontal bars or indicators 16 and 17 which may be used to indicate banking and rolling of the craft by being read against index marks 18, 18', 19 and 19' on a ring 13' to the rear of the glass front 20. Preferably also said ring is graduated as at 21 to show the angle of bank.

The horizon bar 22 in this case is supported by a long lever 23 pivoted at 24 adjacent the rear of the gimbal ring and balanced by counterweight 25 thereon. A pin 26 is shown projecting from the gyro casing through annular slot 27 in the gimbal 4 to engage a normally horizontal slot 25 in rod 23 so that said horizon bar 22 is moved up and down on relative pitching of the craft and gyroscope. The horizon bar will also be tilted laterally upon banking of the craft because it is mounted on the gimbal 4 and tilts with the same. To show the degree of pitch, the vertical bar 13 may be graduated if desired. It should be observed that with this form of the invention complete barrel rolls may be performed without causing any portion of the gyroscope to strike because there is no portion of the support in the way of the horizon bar 22, as in the above referred to application. This is because the forward angular extending portion 22 lies behind the forward pivot 11—12 of the gimbal ring and, therefore, the bar 23 will not strike the supporting bracket for the pivot in case of barrel rolling, as is the case in the prior form of the instrument.

Figure 2:
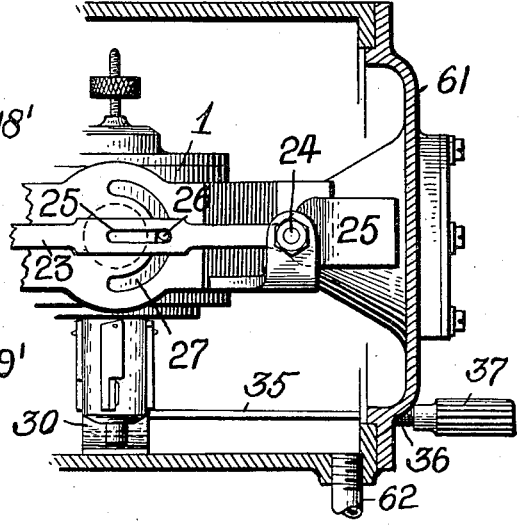
Fig. 2 is a side elevation of the rear portion of the same, the casing being shown in section.
Figure 3:
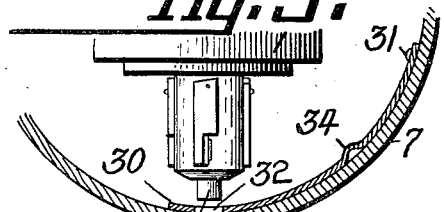
Fig. 3 is a detail showing a locking means employed to lock the gyroscope during shipment.
Figure 4:
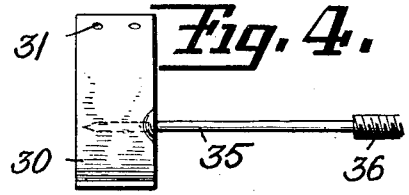
Fig. 4 is a detail of the same.
Figure 5:
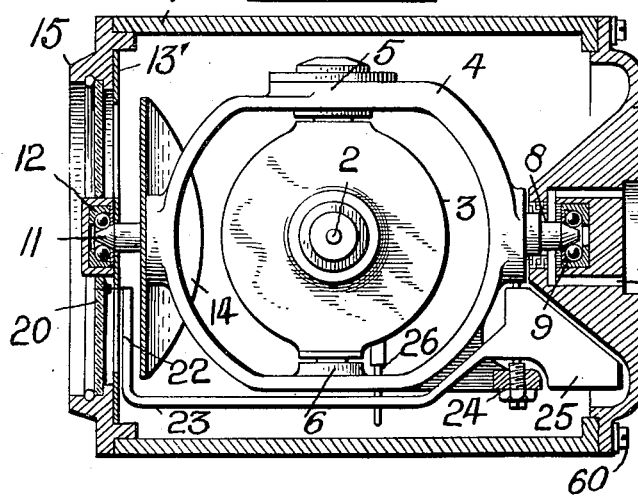
Fig. 5 is a horizontal section through the instrument shown in Figs. 1 and 2.
Figure 6:
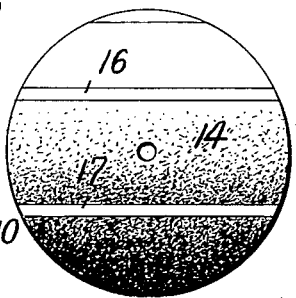
Fig. 6 is a face view of the mask behind the horizon bar which, in this case, carries bank indicating bars or indications.

To prevent damage in shipment, we also provide a simple spring lock comprising a flat spring 30 (see Figs. 2, 3, 4, and 10) riveted to the casing at 31 and having its free end normally lying flat against the casing with a hole 32 lying vertically under a nub 33 on the bottom of the gyro casing. The outer end of the spring may easily be raised by pushing a wedge under a raised lip 34 on the spring. Such a wedge may be in the form of a detachable pointed rod 35 having a threaded portion 36 and a thumb piece 37. To use, one removes one of the set screws 60 normally used to hold back 61 on the housing 7, pushes the rod through the same hole, engages the threads 36 on the rod with the threads in the hole, and then screws the same in to raise the spring, as shown in Fig. 2, and lock the gyroscope, in which condition the gyroscope may be shipped. Upon unpacking, the rod may be unscrewed, the set screw replaced, and the rod stored on the back of the gyro casing, if desired, in a bracket 39 which may be provided for the purpose (see Fig. 10).

Our preferred construction of gyroscope is shown in Figs. 7 and 8. This construction is closely similar to that shown in Figs. 1 and 2 except that instead of using a pin and slot connection between the gyroscope and horizon bar, a cam connection is used. To this end the horizontal trunnion 6' of the gyro casing is extended through the gimbal 4 and carries at its outer end a cam 40 which engages the internal side walls of a rectangular enlargement 41 in the bar 23'. It will readily be seen, therefore, that as the gyroscope rocks back and forth relative to the casing that the horizon bar 62 will be moved up and down as before but that there will be no interference with the gyroscope, even though the airplane loops the loop, as there would be in the form shown in Fig. 1 on account of the limited length of the slot 27. With this form of the invention, all maneuvers may be performed without putting the gyroscope out of use temporarily.

Another modification from Fig. 1 is that the horizon bar 62 in this case is looped around the forward trunnion 11 of the gimbal as at 43, thus providing a continuation of the horizon bar at 62' each part of the bar lying to one side of the gimbal pivot 11. The horizon bar, therefore, is of greater effective length than Fig. 1 and, therefore, more effectively indicates both pitching and rolling. Since the U bend 43 may be made deep enough not to strike the pivot 11 when the bar is in its lowest position, this construction does not interfere with either barrel rolls or looping.

Preferably the instrument is mounted on the instrument board by means of exterior horizontal trunnions 46, 47 journaled in brackets 48, 49 on the rear of the instrument board. Said trunnions lie preferably in substantially the same horizontal plane as the center of oscillation of the gyroscope so that the horizon bar may be carefully lined up with the cooperating indices 50 on the forward ring 15' of casing when installing the instrument. This is preferably accomplished by a single adjustable foot 52 at the base of the instrument, a set screw 53 with a knurled head 54 being provided to adjust the bottom of the casing toward and away from the panel so as to secure proper trim of the instrument on the craft. This may vary with various conditions of loading of the aircraft, since the proper angle of attack is not a constant when the load is varied in amount or position on the craft. Hence the pilot may reset the screw 54 in flight so that the horizon bar shows level when the machine is flying level. By having the pivots 46, 47 in the plane of the center of gravity, whipping of the instrument on the vibrating instrument board is also avoided.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In an artificial horizon for aircraft, a rotor bearing frame, a gimbal ring supporting said frame for oscillation about a horizontal axis extending transversely of the aircraft, an outer casing in which said gimbal is pivoted about a fore and aft horizontal axis at the front and back of said casing, a horizon bar pivotally mounted on said gimbal and having the forward end extending at right angles thereto and lying to one side of and behind said forward pivot, and circular cam and slot means connecting said frame and bar to rock the bar up and down on pitching of the craft, while permitting somersaulting without disturbing the gyroscope.

2. In an artificial horizon for aircraft, a rotor bearing frame, a gimbal ring supporting said frame for oscillation about a horizontal axis extending transversely of the aircraft, an outer casing in which said gimbal ring is pivoted about a fore and aft horizontal axis adjacent the front and back of said casing, a horizon bar pivotally mounted on said gimbal ring, and having the forward portion thereof extending at right angles thereto and at least a portion thereof lying to one side of and behind said forward pivot so as to permit barrel rolling, and a circular cam and slot connection between said frame and bar to rock the bar up and down and to permit somersaulting without disturbing the gyroscope.

3. In an artificial horizon for aircraft, a rotor bearing frame having horizontal trunnions, a gimbal ring supporting said frame for oscillation on said trunnions, an outer casing in which said gimbal is pivoted about a fore and aft horizontal axis adjacent the front and back of said casing, a horizon bar pivotally mounted on said gimbal and having no portion thereof the path of movement of which intercepts the forward gimbal ring pivot in said casing, an eccentric on one of said trunnions, and a cooperating slot in said bar whereby pitching of the craft moves the horizon bar in the opposite direction to the pitch.

4. The combination with a free gyroscope and its enclosing casing, of a lock therefor comprising a flat spring normally adapted to lie against the casing and having a raised lip, and a detachable rod insertable from without the casing for engaging said lip and raising the spring to lock the gyroscope.

5. In combination with a free gyroscope including a rotor bearing frame mounted in a gimbal for oscillation about a plurality of axes within an enclosing casing, of a lock therefor adapted to prevent oscillation in any direction comprising a flat spring normally adapted to lie against the casing, and means operable from without the casing for raising said spring to engage the rotor bearing frame.

BERT G. CARLSON.
LESLIE F. CARTER.